United States Patent [19]

Jezbera

[11] Patent Number: 4,497,110

[45] Date of Patent: Feb. 5, 1985

[54] METHOD OF MAKING A HAMMER BANK ASSEMBLY

[75] Inventor: Val K. Jezbera, Thousand Oaks, Calif.

[73] Assignee: Dataproducts Corporation, Woodland Hills, Calif.

[21] Appl. No.: 496,420

[22] Filed: May 20, 1983

Related U.S. Application Data

[62] Division of Ser. No. 299,043, Sep. 3, 1981, Pat. No. 4,373,440, which is a division of Ser. No. 65,766, Aug. 13, 1979, Pat. No. 4,395,945.

[51] Int. Cl.³ .......................... H01F 7/06; H01S 4/00

[52] U.S. Cl. .................................. 29/602 R; 29/418; 29/592 R

[58] Field of Search ................. 29/418, 592 R, 602 R; 101/93.29, 93.34, 93.04, 93.05, 93.09, 93.14, 93.48

[56] References Cited

U.S. PATENT DOCUMENTS 3,568,593 3/1971 Papadopoulos .................. 101/93.34
3,983,806 10/1976 Ishl .................................. 101/93.34
4,044,455 8/1977 Watanabe et al. .................... 29/418
4,114,532 9/1978 Arzoumanian ...................... 335/296
4,164,180 8/1979 Ellefson et al. .................. 101/93.34
4,269,118 5/1981 Jezbera ............................ 101/93.34

*Primary Examiner*—Howard N. Goldberg
*Assistant Examiner*—P. W. Echols
*Attorney, Agent, or Firm*—Spensley Horn Jubas & Lubitz

[57] ABSTRACT

A hammer bank assembly for use in line printers. The assembly includes an extruded metal rear frame having a uniform thickness and a plurality of machined mounting surfaces which are machined in accurate relationship with respect to one another. A pair of extruded plastic shoes are mounted to the top and bottom of the frame and also include machined surfaces for accurately aligning them with respect to the frame. The shoes include a plurality of mounting slots which are cut by means of a gang cutter. The slots serve to accurately align a plurality of print hammers in the shoes. The hammers are insulated with respect to the frame and the shoes in order to prevent sliding motion and subsequent wearing of the print hammers. Also disclosed are several methods of simplifying the construction procedure of the hammer bank assembly.

1 Claim, 12 Drawing Figures

FIG. 3
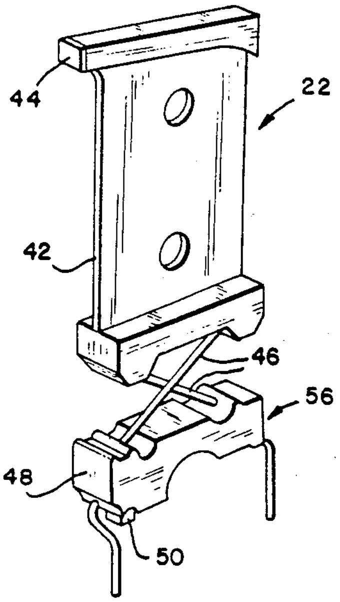
FIG. 2
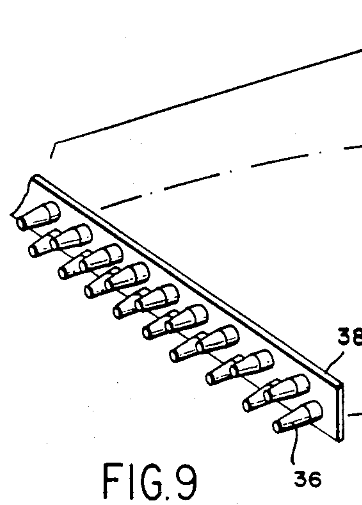
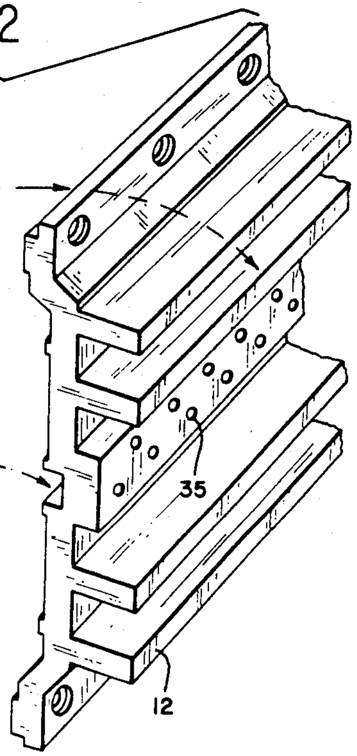
FIG. 9
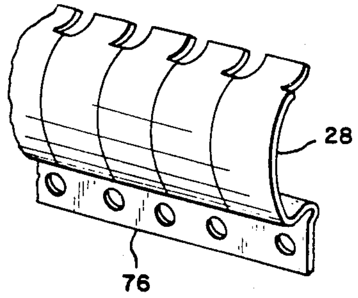
FIG. 10
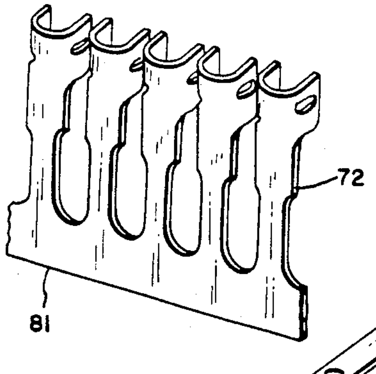
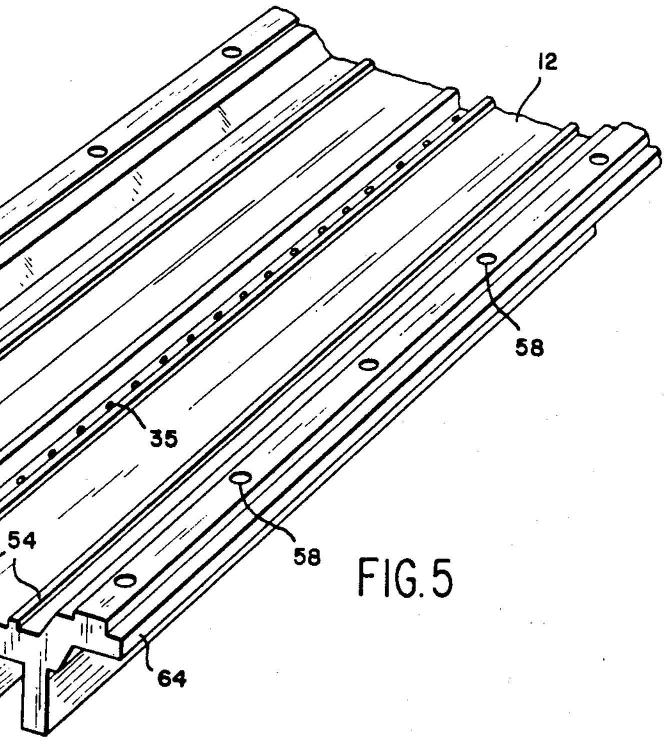
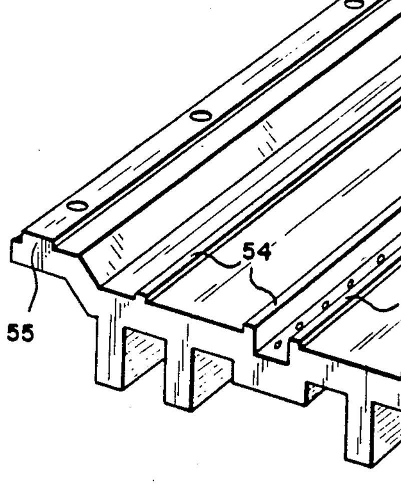
FIG. 5

METHOD OF MAKING A HAMMER BANK ASSEMBLY

This is a division of application Ser. No. 299,043, filed on 9-3-81, now U.S. Pat. No. 4,373,440; which is a divisional application of Serial No. 065,766, filed on 8-13-79, now U.S. Pat. No. 4,395,945.

BACKGROUND OF THE INVENTION

1. Field of the Invention

This invention relates generally to improvements in hammer bank assemblies useful in line printers. Such assemblies carry a plurality of hammers, each of which includes an impact tip carried on a flat coil and supported by a pair of flexible conductive members for substantially rotational movement about a horizontal axis perpendicular to the plane of the flat coil. A plurality of magnets are interleaved with the hammers so that the hammers are disposed in a permanent magnetic field. When a coil is energized, a force is developed on it to accelerate it from a rest position to impact against, paper, a ribbon and a font carrier band or a character drum mounted for rotation about an axis also extending perpendicular to the plane of the coil structure.

2. Description of the Prior Art

In order that the impact tips of all of the hammers in an assembly be presented on a common printline, it is necessary to accurately align and mount the hammer and magnet assemblies. In addition, it is essential that all of the hammers have a precise rest position with respect to the drum or font carrier band and that they be precisely fired and accelerated to impact when the drum or band is in the appropriate position. In addition, the accuracy of the mountings must be retained in spite of the great deal of vibration which occurs during the operation of the printer.

Various systems have been developed to accurately mount the hammers and magnets and to precisely establish the rest position of each hammer. In U.S. Pat. No. 3,643,595, issued to Helms, et al. on Feb. 22, 1972, an elongated mounting bar is provided defining a plurality of truncated V-shaped recesses along the length thereof. Each recess is shaped so as to receive and precisely position a foot member of a hammer module. Bolts are utilized to secure the hammer module to the mounting bar and to vertically position the hammer with respect to the mounting bar. Backstop screws having a deformable and resilient sleeve molded around them are utilized to adjust the rest position of the hammers.

U.S. Pat. No. 3,983,806, issued to Ishi on Oct. 5, 1976, discloses a mounting structure that includes at least one rigid cylindrical tube and a plurality of fastening members disposed therealong. Each hammer has a foot member which includes a recess of substantially semicircular cross-section dimensioned to conform to the periphery of the rigid tube. A plurality of magnets are mounted on a common foot member which has a recess of substantially semicircular cross-section also dimensioned to conform to the tube periphery. The semicircular surfaces serve to align the hammers and magnets with respect to the cylindrical tube. Multiple adjustable backstop screws are also utilized to establish the rest position of each hammer.

In U.S. Pat. No. 4,114,532, issued to Arzoumanian on Sept. 19, 1978, a magnet assembly for use in a hammer bank assembly is disclosed. The magnet assembly includes a plurality of spaced, relatively thin, substantially rectangular magnetic members mounted along first and second parallel rows. The magnetic members are aligned so as to define aligned gaps, each of the aligned gaps receiving a flat hammer coil. Various magnetic materials are employed for the magnet members.

SUMMARY OF THE INVENTION

The present invention is directed to an improved hammer bank assembly for accurately aligning both print hammers and magnets and for further simplifying and reducing the cost of such an assembly. The assembly includes an extruded one-piece rear frame having a uniform thickness and a plurality of precisely milled mounting surfaces. The mounting surfaces are utilized to position various components of the assembly in proper relationship with respect to one another.

An extruded mounting shoe also has a machined mounting surface which is mated with one of the mounting surfaces of the rear frame so as to accurately position the shoe with respect to the frame. The shoe includes a plurality of front and rear parallel slots which are cut by means of a gang cutter after the shoe has been secured to the frame, thereby ensuring accurate alignment of the slots.

Each hammer which is to be mounted in the assembly includes a foot section that has a pair of aligned tabs extending from it. The tabs fit into the slots in the shoe section and accurately align the hammers with respect to the rear frame. In addition, a pair of conductive springs, which extend through the foot section of each hammer are aligned with the pegs and extend through the slots in the shoes. A portion of each foot contacts one of the machined surfaces of the rear frame and rotationally aligns the hammer with respect to the frame. A rigid rod runs the length of the shoe in order to minimize the effects of shoe warpage while retaining shoe flexibility. Cushions are provided between the foot and the rod and the foot and the rear frame. The cushions serve to absorb kinetic energy generated when a hammer is energized and also to prevent shearing between the foot and either the frame or rod.

Magnets which are interleaved with the hammers are mounted on another machined surface on the front of the rear frame so as to accurately position them with respect to the hammers.

A plurality of clips, originally attached to a common bar, serve to secure the foot sections in position in the shoe. The clips for the entire hammer bank assembly attached to a common bar and are initially secured in place in a single step. The common bar is then removed, resulting in an individual clip securing each foot section. This facilitates easy removal and replacement of individual hammers. Similarly, a plurality of connecting strips which connect the conductive springs of the hammers to electronic circuits of the printer, are initially held together by a common bar and soldered onto the hammer springs as one piece. The bar is then removed, resulting in a plurality of individual solder connections. The electronic circuits are attached to a PC board which is an integral part of the hammer bank assembly. This feature eliminates the need for any type of connecting wires or harnesses, thus further simplifying the design of the assembly.

BRIEF DESCRIPTION OF THE DRAWINGS

In the drawings, wherein like numerals refer to corresponding elements:

FIG. 2 is a rear perspective view of the hammer bank assembly of the present invention showing a backstop screw tip strip;

FIG. 3 is a perspective view of a print hammer used in the hammer bank assembly;

FIG. 5 is a perspective view of the rear frame of the hammer bank assembly.

FIG. 9 is a plan view of clips connected to a common strip; and

FIG. 10 is a perspective view showing connectors used in the hammer bank assembly.

DETAILED DESCRIPTION OF THE DRAWINGS

Figure 1:
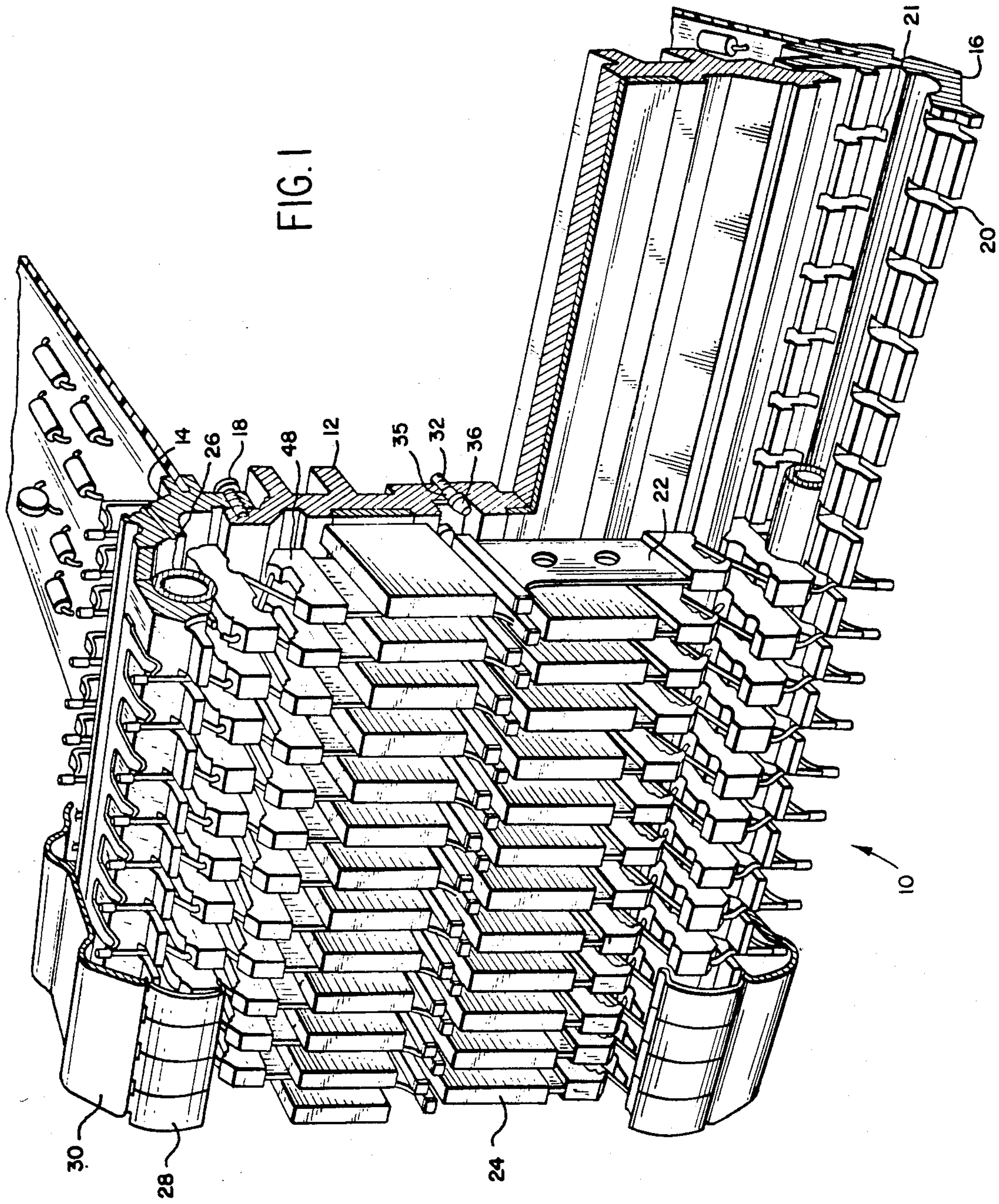
FIG. 1 is a perspective view of the hammer bank assembly of the present invention, showing several portions partially cut away.

Referring to FIG. 1, a hammer bank assembly 10 includes a rear frame 12, which in the present embodiment is extruded aluminum. Secured to the rear frame 12 are upper and lower mounting brackets, or shoes, 14 and 16. The shoes 14 and 16 are also extruded, but are made of ABS (acrylonitrile-butadiene-styrene) plastic material rather than metal. The shoes 14 and 16 are secured to the rear frame 12 by means of a plurality of screws 18. The shoes 14 and 16 have a plurality of front parallel slots 20 and rear parallel slots 21 cut in them. The front slots 20 are somewhat offset with respect to the rear slots 21. A plurality of print hammers 22 are aligned with the slots 20 and 21 and are secured to the shoes 14 and 16 and the rear frame 12. By aligning them with the slots 20 and 21, the hammers 22 are arranged in an equally spaced parallel relationship. The hammers 22 connected to the upper shoe 14 are interleaved with those connected to the lower shoe 16 and the positioning is such that all of the hammers in the assembly (i.e., both upper and lower groups) will print on a common print line.

A plurality of generally rectangular magnets 24 are interleaved with both the upper and lower groups of hammers 22. The magnets 24 are secured directly to the rear frame 12 by means of an adhesive, such as epoxy or an acrylic type. The purpose of the magnets 24 is to produce a magnetic field for use in propelling the hammers 22 toward a paper, ribbon and type bearing surface (not shown). One particular magnet assembly is disclosed in U.S. Pat. No. 4,144,532, issued to Arzoumanian on Sept. 19, 1978 and assigned to the same assignee as the present invention. In the typical hammer bank assembly of the present invention, there are a total of one hundred thirty-two print hammers 22 and one hundred thirty-four magnets 24. These numbers are illustrative only, and the principles of the present invention could be applied to hammer bank assemblies with any number of hammers and magnets. Typically, the hammers 22 have a body thickness on the order of 0.05 inches and the magnets 24 have a thickness on the order of 0.15 inches. Because of these small dimensions, it is extremely critical that the hammers 22 and magnets 24 be accurately aligned and mounted.

Referring further to FIG. 1, the hammers 22 are supported on cylindrical metal tubes, or shoe stiffeners 26, which fit into and extend the length of the upper shoe 14 and lower shoe 16. Each hammer 22 is retained on either the upper shoe 14 or lower shoe 16 by means of a removable metal clip 28. A plastic cover portion 30 covers the shoes 14 and 16 and protects connectors which extend from them. A plurality of backstop screws 32 are screwed into threaded holes 35 in the rear frame 12 and extend into backstop screw tips 36 which abut each of the hammers 22. The backstop screws 32 are initially screwed into the frame 12 and the tips 36 are then inserted onto the protruding screws 32 from the front of the frame 12. The backstop screws 32 are adjustable to permit individual variation of the rest position of each of the hammers 22.

The backstop screw tips 36 are made of a deformable plastic material and are all attached to a common strip 38, as can be seen more clearly in FIG. 2. The use of the strip 38 permits the backstop screw tips 36 to be positioned over the backstop screws 32 in a single step rather than requiring individual placement. The adjustment range of the screws 32 is such that the tips 36 can be left connected to the strip 38 without their movement interfering with one another. That is, the adjustment of one screw 32 and tip 36 will not cause any significant movement of any other tips 36 in spite of the comon connection to the strip 38. In the event that an individual tip 36 becomes defective, its corresponding screw 32 is removed. A special tool (not shown) is then inserted into the opening left by the screw 32. The tool cuts the defective tip 36 from the strip 38 and pulls it back through the opening 35. A new tip can then be inserted into the opening 35 through the rear of the frame 12 attached to the screw 32. Thus replacement of a backstop screw tip in a simple manner, without requiring removal of any print hammer or the connecting strip 38, is facilitated.

Figure 8A:
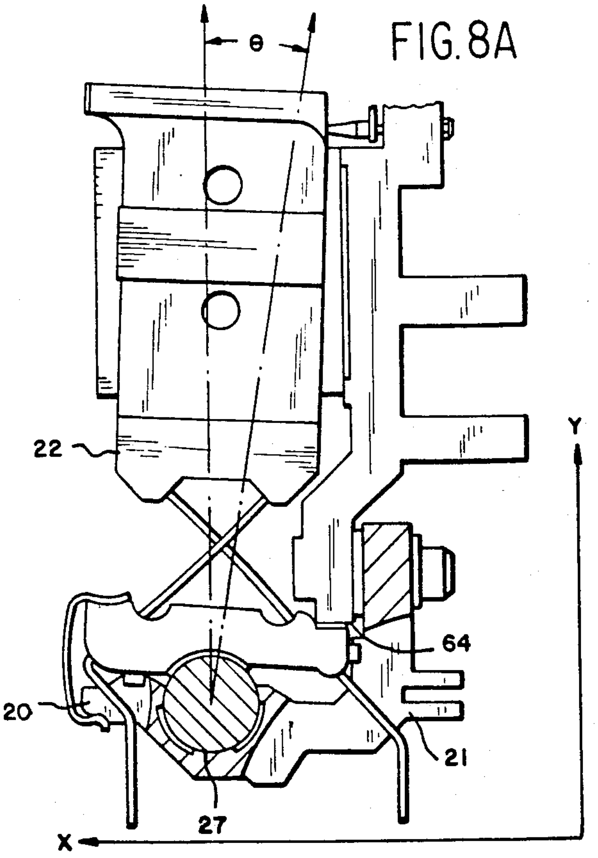
FIGS. 8*a, b* and *c* show the exact positioning control which the present assembly provides.
Figure 8B:
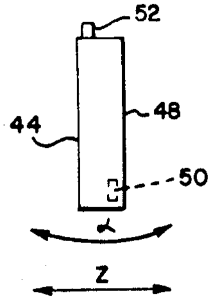

Referring now to FIGS. 3 and 8B, each hammer 22 includes a rigid coil structure 42 to which is connected an impact tip 44. The hammer assembly is fully described in copending application U.S. Ser. No. 122,064 abandoned in favor of Ser. No. 339,747, now U.S. Pat. No. 4,407,194. Extending from the coil structure 42 are a pair of conductive springs 46 whose ends, remote from the coil structure 42, pass through a foot section 48. The foot section 48 is commonly made of an epoxy material, although other materials may be utilized. The springs 46 are offset with respect to one another so that they do not contact each other at their crossing point. A lower tab 50 is formed near the front of the foot 48 and parallel to the spring 46 which passes through the front of the foot 48. Similarly, a rear tab 52 is formed on the back of the foot 48 and is parallel to the spring 46 which extends through the rear of the foot 48. As can be seen more clearly in FIG. 4, the front tab 50 fits into a front slot 20 and the back tab 52 fits into a rear slot 21. The offset distance between the front slots 20 and the rear slots 21 is equal to the offset between the tab 50 and the tab 52. Therefore, the hammers 22 are aligned parallel to the slots 20 and 21.

Figure 4:
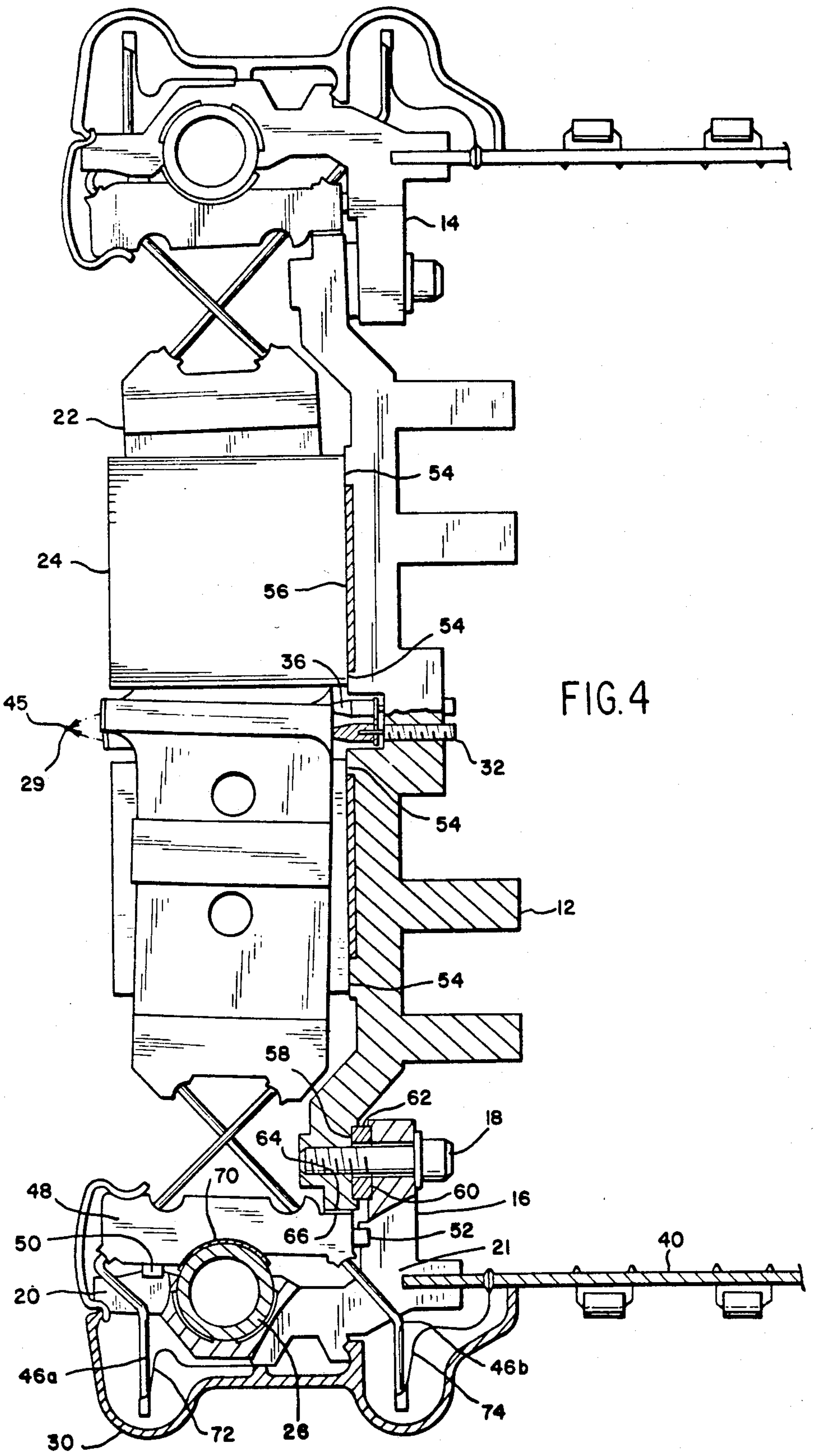
FIG. 4 is a side plan view, partially in section, of the hammer bank assembly.

Referring further to FIG. 4, it can be seen that the thickness of the rear frame 12 is generally uniform. Since the frame 12 is extruded, there is the possibility that it will warp upon cooling. In order to minimize this possibility, the frame 12 is extruded so that it has a generally uniform thickness. In order to insure accurate alignment of the magnets 24 and hammers 22 despite the use of an extrusion, different mounting surfaces on the frame 12 are machined.

Initially, co-planar mounting surfaces 54 are machined on the front of the frame 12 and are utilized to align the magnets 24. If the front of the frame 12 were machined along the entire length of the magnets 24, there would be the possibility that the machining would cause the frame 12 to warp. In order to reduce the amount of warpage while at the same time providing an accurately machined mounting surface for mounting the magnets 24, a pair of recessed areas 56 are formed on the front of the frame 12 and the surfaces 54 are kept relatively narrow. By minimizing the amount of the surface of the frame 12 which is machined, warpage caused by the machining process will be reduced. In order to secure the magnets 24 to the frame 12, an adhesive is placed in the recesses 56. By securing the magnets 24 to the reference surfaces 54, they may be accurately aligned with respect to the frame 12.

To insure proper alignment of the shoes 14 and 16 with respect to the frame 12, a plurality of counterbores 58 are machines into the frame 12 at the points where the screws 18 secure the shoes 14 and 16 to the frame 12. The counterbores 58 are machined with reference to, i.e., a particular distance from, the mounting surfaces 54 and 64. The mounting shoes 14 and 16 include a plurality of machined counterbores 60 which correspond in position to the counterbores 58. The counterbores 60 are all machined a fixed distance from position of the shoe stiffener 26. A dimensionally accurate spacer 62 is located between each pair of counterbores 58 and 60 and serves to locate the counterbores 58 and 60 in the correct spaced relationship to one another. Since the counterbore 58 is referenced to the mounting surfaces 54 and since the counterbore 60 is machined with respect to the shoe stiffener 26, the shoe stiffener 26 will be accurately located with respect to the magnets 24.

It is desirable to place a prestress upon the springs 46 in order to assure their proper action. To do this, the hammers 22 are mounted so that they are tilted back towards the rear frame 12 and in contact with the tips 36 of the backstop screws 32. The tilting of the hammers 22 is controlled by a machined surface 64 located at the top and bottom edges of the frame 12 and by the backstop screws 32.

Although FIG. 4 shows upper and lower hammer assemblies, a single assembly could be utilized. In the usual case where both upper and lower assemblies are utilized, the entire assembly is designed so that the upper and lower hammers are presented on a common print line, i.e., so that they are in line at impact.

Referring to FIG. 5, the machining sequence of the frame 12 will be explained. Initially, the frame 12 is clamped to a three point support (not shown), resting on its back side. The surfaces 54 and both of the surfaces 64 are then machined. The surfaces 64 are parallel and very accurately spaced. A reference surface 55 on one of the ends of the frame 12 is also machined at this time. The frame 12 is then flipped over and accurately located by reference to the surfaces 54, 55 and 64. The counterbores 58 are then machined in precise location, as are the threaded holes 35 for the screws 18 and 32 respectively. The faces of the counterbores 58 are machined a fixed distance from the surface 54, while the walls of the counterbores 58 are machined a particular distance from and parallel to the surfaces 55 and 64. All of the mounting surfaces and holes on the frame 12 are therefore accurately located with respect to one another.

Figure 6:
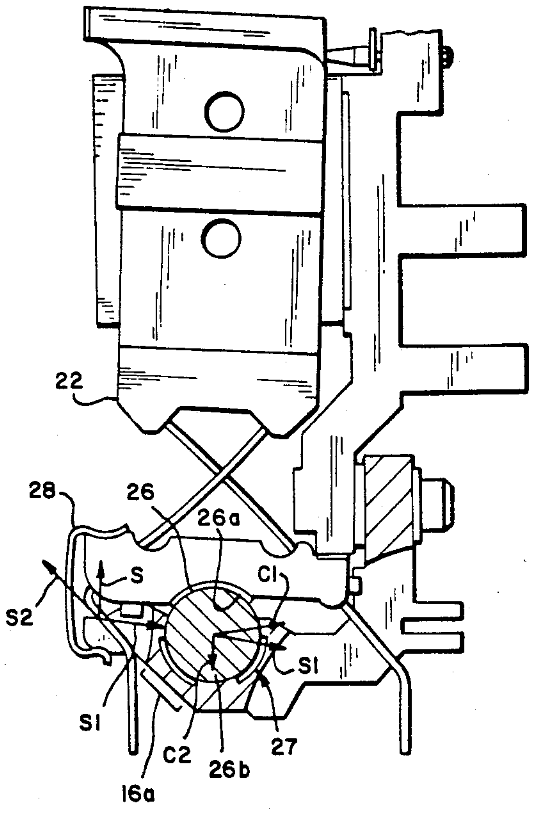
FIG. 6 is a schematic showing locating forces which act upon shoe stiffening rods in the hammer bank assembly.

Referring to FIG. 6, the shoe stiffener 26 serves the purpose of supporting the foot section 48 of the hammer 22 and providing rigidity to the extruded plastic shoes 14 and 16. The shoe stiffener 26 is located in a three point support defining an opening 27 which encloses a space somewhat larger than 180 degrees. The shoe sfiffener 26 is snapped into the opening 27. Due to the forces which act upon the shoe stiffener 26, it will be accurately positioned in the opening 27 of the shoe 16. The spring clip 28 applies a force S to the front of the shoe 16. The portion 16*a* of the shoe 16 is relatively thin and the force of the clip 28 thus tends to flex the front of the shoe 16. The force S can be resolved to forces S1 and S2, with S1 acting through one of the support points of the opening 27 to the center of the stiffener 26. The force S1 may further be resolved into forces C1 and C2 acting through points 26*a* and 26*b* on the stiffener 26. The forces C1, C2 and S1 against the three point support serve to maintain the stiffener 26 in the correct location in the shoe 16. This in turn serves to accurately locate the hammers 22 with respect to the shoe 16.

Referring again to FIG. 4, when a hammer 22 is energized, an extremely large reaction force is developed in the foot section 48. Because the foot 48 is made of a plastic material with a relatively low modulus of elasticity, relative motion between it and the frame 12 or the shoe stiffener 26 can wear away the surface of the foot 48 relatively quickly, thus ruining the alignment and proper operation of the hammer 22. In order to absorb and dissipate kinetic energy and to eliminate frictional effects of any sliding or vibrational motion between the foot 48 and the surface 64 of the frame 12, a thin elastic cushion 66 is secured to the mounting surface 64. Similarly, an elastic cushion 70 is secured to the top of the shoe stiffener 26. Any relative motion between the foot 48 and the surface 64 or shoe stiffener 26 will occur within the elastic range of the cushions 66 and 70, and there will therefore be an no sliding between any adjacent surfaces. The cushions 66 and 70 therefore serve to absorb kinetic energy and to prevent scraping between the foot 48 and the frame 12 and between the foot 48 and the shoe stiffener 26. In addition, the design of the assembly is such that any gradual compression which occurs in the cushions 66 and 70 will not result in any significant change in the distance between the hammer tips 44 and an impact point 45. Deformation of the cushion 70 will cause vertical movement of the hammer 22, which will clearly not change the distance between the hammer tip 44 and impact point 45. Deformation of the cushion 66 will cause rotational movement of the hammer about the center of the stiffener 26. However the distance from the cushion 66 to the stiffener center is such that minimal movement of the impact tip 44 with respect to the point 45 will occur.

Referring further to FIG. 4, the springs 46 include lower portions 46*a*and 46*b* which extend through the slots 20 and 21, respectively. Each of the springs 46*a* passing through the front slots 20 is soldered to a connecting finger 72 which is part of a common bus bar 72*b*. Each of the springs 46*b* passing through the rear slots 21 is soldered to a connecting finger 74, the other end of which is connected to a printed circuit board 40 which is secured to the shoe 16. The cover 30 encloses the wires 46*a*, 46*b*, 72 and 74 and serves to protect them from damage.

Figure 7:
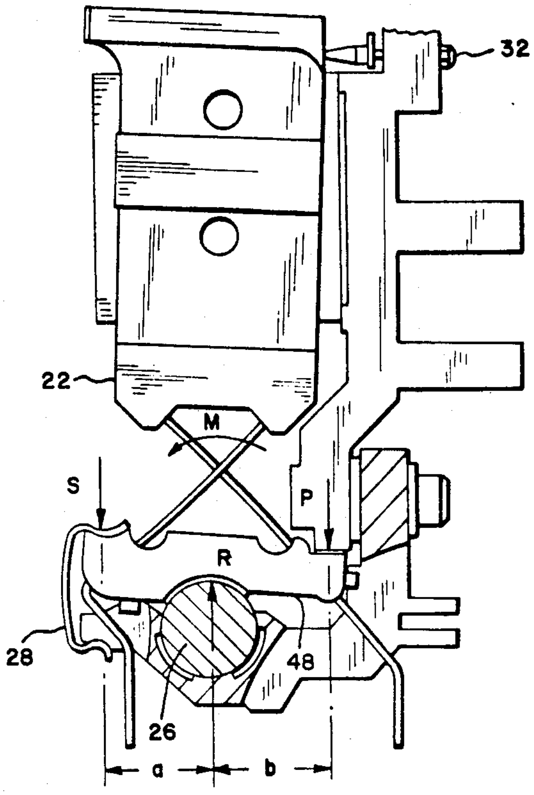
FIG. 7 shows forces which serve to locate hammers in the assembly.

Referring to FIG. 7, the hammer assemblies are designed so that actuation of a hammer 22 will not cause it to become unseated and misaligned. Forces acting on the hammer foot 48 are essentially a downward force S generated by the spring clip 28, a downward force P exerted at the rear of the foot 48, a moment M which exists when the hammer 22 is actuated (or preloaded by a backstop screw 32), and an upward force R acting through the center of the shoe stiffener 26. The force S acts at a distance (a) from the center of the shoe stiffener 26, and the force P acts at a distance (b) from the center of the shoe stiffener 26. The force equations for the arrangement are as follows:

$$S-R+P=O \quad (1)$$

$$Sa-Pb+M=O \quad (2)$$

Since S remains constant for a given assembly, any moment M must be compensated for by a change in P. Therefore, $$M=Pb \quad (3)$$

Also, for S=constant, any change in P must be compensated for by a change in R, so that $$P=R \quad (4)$$

When the hammer 22 is not preloaded and not in motion, M will equal zero. From equations (1) and (2) above, when M=0

$$R=S(1+a/b)$$

By setting a equal to b, $$P=S, \text{ and}$$

$$R=2S$$

This represents a mechanical advantage obtained by applying S at a spaced distance from the shoe stiffener 26. The forces P and R which serve to locate the foot 48 on the shoe stiffener 26 and the frame 12 thus have values S and 2S when there is no hammer motion or preload.

Where there is a preload or when the hammer 22 is in motion, M will become non-zero. From equations (3) and (4), therefore $$\Delta P=M/b \text{ and}$$

$$\Delta R=M/b$$

Therefore, $$P \text{ total } =P+\Delta P=S+M/b, \text{ and}$$

$$R \text{ total } =R+\Delta R=2S+M/b$$

Thus, as the moment M increases due to hammer motions, the forces R and S which serve to locate the hammer foot 48 will also increase, thereby maintaining accurate location of the hammer foot 48.

Figure 8C:
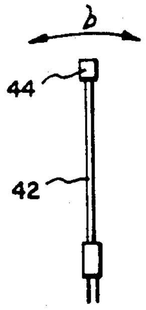

The mounting system described provides for complete control over the location of the hammers 22. As shown in FIG. 8*a*, the front to rear (x) and height (y) locations of the hammer 22 are determined by the position of the shoe stiffener 26. The front to back tilt ($\theta$) of the hammer 22 is determined by the surface 64. As shown in FIG. 8*b*, the horizontal location (z) and the skew alignment $\alpha$ of the hammer 22 in the shoe 16 is determined by the slots 20 and 21. The sideways tilt $\delta$ (FIG. 8*c*) of the hammers 22 is determined by the shoe stiffener 26 and the surface 64. The shoe stiffener 26, the slots 20 and 21 and the surface 64 thus provide complete control over the position of the hammers 22.

Referring now to FIGS. 4 and 9, all of the clips 28 are attached to the feet 48 and the shoe 16 in a single operation. The clips 28 are formed connected to a common strip 76. The clips 28 are spaced apart on the strip 76 a distance which is equal to the distance between adjacent feet 48. The use of the strip 76 enables all of the clips 28 to be attached at one time, thus simplifying the procedure of securing the feet 48 to the shoe 16. Similarly, the clips 28 which secure the feet 48 to the shoe 14 are attached to a common strip 76 and may be put on the hammer bank assembly in one procedure. After the clips 28 have been attached, the common strip 76 is broken off, thus resulting in a plurality of individual unconnected clips 28. If a hammer 22 must be replaced, any individual clip 28 may be removed without disturbing any of the other clips 28 or hammers 22. Therefore, although all of the hammers 22 are secured in the hammer bank asembly in one step, it appears that they have all been individually attached.

The solder connections on the springs 46A are also completed in a single step. All of the connectors 72 are connected to the bus bar 81 as shown in FIG. 10. Similarly, the connectors 74, one end of which were previously soldered to the PC board 40, are initially connected at their free ends to a common strip (not shown). The connectors 72 and 74 are positioned around the springs 46*a* and 46*b* and dipped in a solder bath so as to make all the solder connections in one step. The common strips for the connectors 74 is then removed so as to form a plurality of individual solder connections. The one step soldering process greatly simplifies the manufacture of the hammer bank assembly. The flexible connectors 72 and 74 absorb a great deal of vibrational energy which would otherwise weaken the solder connections. The electrical connections are thus made in a simple manner and are very strong.

In summary, the present invention is directed to an improved hammer bank design. Several design principles are utilized to achieve highly accurate mounting of print hammer assemblies while at the same time minimizing the cost of the hammer bank assembly. According to a first feature of the invention, the assembly includes a rear frame which is made of extruded metal and which is formed having a uniform thickness in order to minimize warpage problems. According to a second feature of the invention, the frame includes a plurality of machined reference surfaces which serve to accurately align various components with respect to one another. A reference surface upon which the magnets are mounted may include a recessed portion so as to minimize warpage caused by the machining of the reference surface.

According to a further feature of the invention, an extruded plastic shoe is attached to the rear frame. The shoe section, which is easily machinable, has a plurality of parallel slots cut in it by means of a gang cutter. The slots serve to accurately align the print hammers in the hammer bank assembly. The shoe serves to support the hammers and to absorb energy generated when the hammers are actuated. A shoe stiffener rod connected to the shoe provides rigidity while maintaining the energy absorbtion characteristics. Elastic cushions may be included to accommodate relative motion between the print hammers and the surfaces upon which they are mounted.

In order to simplify manufacture, several components are attached to the assembly while connected to a common strip. After attachment, the common strip is removed, resulting in a plurality of individual connections. This procedure is used to attach clips which secure the hammers to the assembly, and connectors between the electrical components of the assembly and the print hammers.

The design uses slots to both locate the hammers and provide a way for the conductive springs to get to the rear of the assembly. This permits PC boards to be attached directly to the assembly, thus obviating the need for any external wiring harness and simplifying the external wiring of the hammers. The conductive springs are connected by flexible connectors to the PC boards in such a way that stresses created during operation will not dislodge the connections.

Although particular embodiments of the invention have been described and illustrated herein, it should be recognized that modifications and varitations may readily occur to those skilled in the art and consequently it is intended that the claims be interpreted to cover such modifications and equivalents. In particular, the invention is equally applicable to hammer bank assemblies having either a single assembly or interleaved upper and lower assemblies. In the case where two assemblies are used, identical shoe assemblies, inverted with respect to one another, are attached to a common frame. The shoe assemblies position the upper and lower banks of hammers so that their impact tips are presented on a common print line. The mounting surfaces on the frame are all machined with respect to one another so that the entire hammer bank assembly is in accurate alignment.

I claim:

1. A method of manufacturing a hammer bank assembly, said assembly using hammers having a flat coil structure supported by a pair of crossed spring wires which extend through a generally rectangular foot member, comprising the steps of:

providing an elongated frame assembly having a rear vertical portion and a forwardly extending horizontal portion;

positioning the foot members of said hammers in said frame assembly above said horizontal portion;

securing said foot members to said frame assembly by placing a plurality of clips over the front of said horizontal portion and the front of the foot members, said clips being connected to a common strip member so as to facilitate one step installation of said clips; and removing the common strip, thereby resulting in a plurality of individually removable clips.

* * * * *